Figure 1:
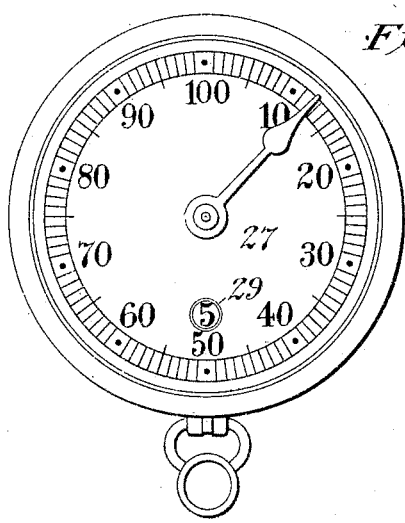

B. VOLKMAR.
VIBRATION INDICATOR.
APPLICATION FILED SEPT. 4, 1908.

962,679.

Patented June 28, 1910.

2 SHEETS—SHEET 1.

Witnesses:

Inventor:
Bernhard Volkmar
by Henry D. Williams
Attorney

B. VOLKMAR.
VIBRATION INDICATOR.
APPLICATION FILED SEPT. 4, 1908.
962,679.
Patented June 28, 1910.
2 SHEETS—SHEET 2.
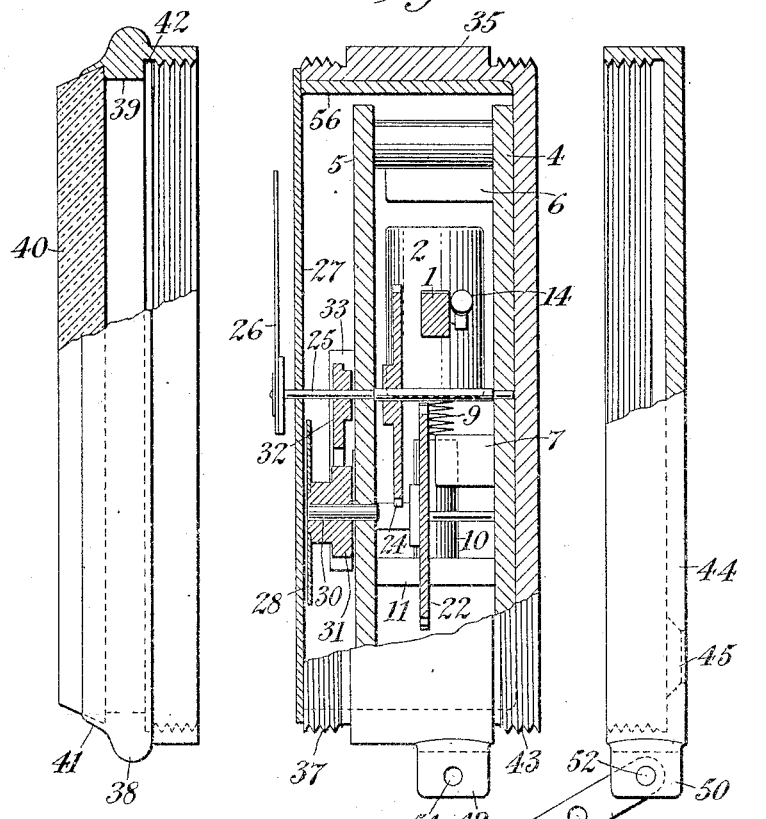
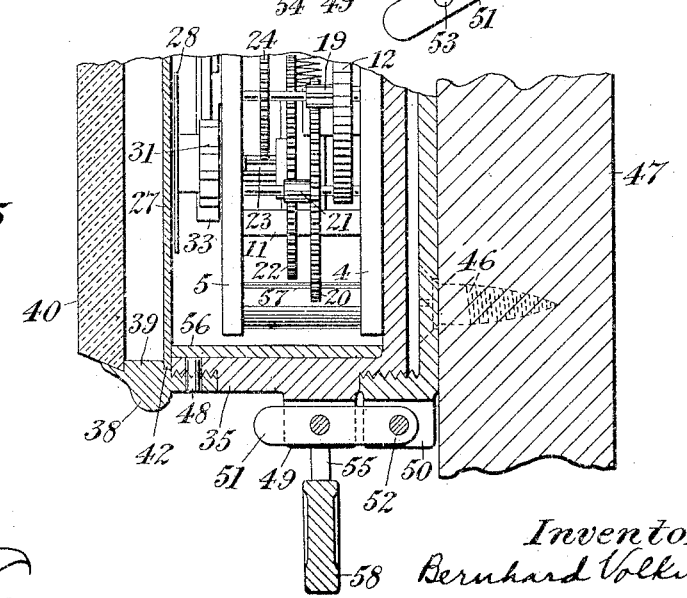
Witnesses:
Bernard Cowen
Harry Lewis
Inventor:
Bernhard Volkmar
by Henry L. Williams
Attorney.

UNITED STATES PATENT OFFICE.

BERNHARD VOLKMAR, OF NEW YORK, N. Y., ASSIGNOR TO AUTO IMPROVEMENT COMPANY, A CORPORATION OF NEW YORK.

VIBRATION-INDICATOR.

962,679.  Specification of Letters Patent.  Patented June 28, 1910.

Application filed September 4, 1908. Serial No. 451,706.

*To all whom it may concern:*

Be it known that I, BERNHARD VOLKMAR, a citizen of the United States, residing at the borough of the Bronx, city of New York, in the county of New York and State of New York, have invented certain new and useful Improvements in Vibration-Indicators, of which the following is a specification, reference being had therein to the accompanying drawings, forming part thereof.

My invention relates to vibration indicators or vibration registering instruments which rely upon the vibration of the part to which the instrument is fitted to operate their mechanisms.

The present invention relates particularly to vibration registering instruments that are adapted to be placed on automobiles to furnish, independently of the ordinary speed or distance registering devices, a telltale or record of the movement of the vehicle, and particularly to furnish an indication of the unauthorized use of the vehicle.

My invention has for its principal objects simplicity and economy of construction, reliability of operation, durability and non-liability to derangement.

My invention includes resilient gravity-opposing means balancing or counteracting the weight of a vibratory inertia member and arranged substantially in vertical alinement with the center of gravity of such member.

My invention also includes several details of construction and combinations of parts as will hereinafter appear.

In carrying my invention into practical effect it is so arranged that no registration will be made of such vibrations as are produced by the running of the engine, thereby permitting the independent running of the engine such as is necessary for getting the same in order.

The practical embodiment of my invention registers only such shocks as are produced by the running of the vehicle and the amplitude of movement of the vibrator is limited so that shocks of different intensities produce substantially the same registrative effects. Friction and wear are reduced and the sensitiveness of the device increased by placing the means for counteracting gravity substantially in vertical alinement with the center of gravity of the vibrating member. The mechanism of the instrument is inclosed in a sealed casing which cannot be opened for the purpose of tampering with the mechanism or readjusting the indicating hand on the dial, thereby assuring an indication of all movements of the vehicle and the preservation of such indication or register. The casing inclosing the mechanism of the device is provided with a hard lining to prevent the insertion therein of a tool or like instrument with the intent to temporarily derange the mechanism and in that manner prevent the indication of the movement of the vehicle.

My invention has other features of advantage which will appear from the following description.

Figure 2:
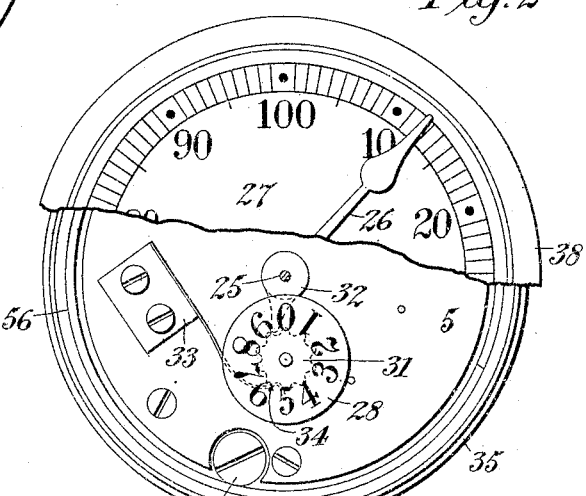
Figure 3:
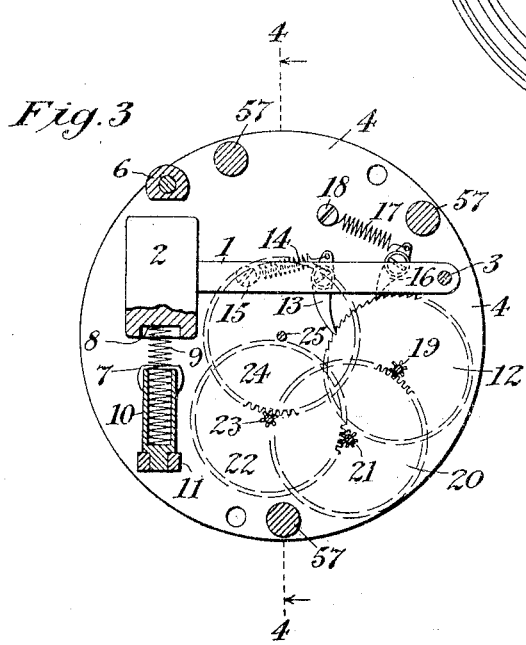

Figure 1 is a plan view of the device embodying my invention drawn to a smaller scale than the other views. Fig. 2 is a plan view, with the main dial partly broken away, and shows the multiplying dial and its actuating means. Fig. 3 is a plan view with parts removed to show the vibrator and the clock train actuating the indicating hand. Fig. 4 is a side elevation, partly in section on planes indicated by the lines 4—4 of Fig. 3, and partly broken away to show the mechanism of the device and the location of the parts in the casing, and with the front cover and the rear cover detached. Fig. 5 is a side elevation, partly broken away to show the clock train and partly in section to show the means for sealing the casing.

The actuating mechanism of the illustrated embodiment of my invention is supported in a frame comprising front and back plates 4 and 5, respectively, and spacing pillars or studs 57. A vibrator or vibrating member, comprising a bar 1 and a cylindrical weight 2 secured to the end of the bar, is pivoted to oscillate on a pin 3 mounted on the frame, its movement or amplitude being limited by contact of the upper and lower faces of the weight 2 with leather buffers or studs 6 and 7 fixed to the back plate 4. The base of the weight 2 of the vibrator is shown as provided with a slight recess 8 arranged to receive the upper end of a light helical spring 9 which projects upward and outward from an inclosing casing 10, the casing being fixed to a stud 11 mounted between the back plates 4 and 5. The spring 9 is so proportioned to the amplitude of movement of the vibrator or inertia member that the spring is compressed through only a fraction of its extent of compressibility by the movement of the vibrator and is laterally guided by its casing 10 to prevent distortion when compressed. The spring 9 is adapted to counteract the weight of the vibrator and normally holds it in a medial or substantially horizontal position.

It should be noted that the spring 9 is in the path of the weight or inertia member 2 and is arranged substantially in vertical alinement with the center of gravity thereof. This arrangement greatly reduces friction and wear of the lever 1 on the pivot 3 and increases to a considerable extent the sensitiveness of the instrument.

A ratchet wheel 12 is engaged by a feed pawl 13, this feed pawl being pivotally mounted on the under side of the bar 1 of the vibrating member and controlled by a helical spring 14, one end of which is secured to the free end of the pawl and the other end of which is coiled about a screw 15 and anchored on the bar 1. The ratchet wheel 12 is also engaged by a stop pawl 16, this stop pawl being pivotally mounted on the back plate 4 and held against the ratchet wheel 12 by a spring 17, one end of which is secured to the free end of the pawl and the other end of which is coiled about a screw 18 and anchored on the back plate. Through these motion transmitting means, the movement of the vibrating member will impart a step-by-step rotation to the ratchet wheel.

The resistance of the indicating mechanism to the force required to drive it is communicated to the lever 1 through the pawl 13 at a point between the weight 2 and the pivot 3 and combines with the resistance of the spring 9 to produce a resultant resistance substantially at the center of oscillation of the lever 1 and weight 2.

Motion is transmitted by the ratchet wheel to a train of gears, comprising a pinion 19 carried by the ratchet wheel 12 meshing with a gear wheel 20, and a pinion 21 carried by the gear wheel 20 meshing with a gear wheel 22; a pinion 23 carried by gear wheel 22 meshing in turn with a gear wheel 24. The gear wheel 24 is fixed on an arbor 25 and upon this arbor an indicating hand 26 is directly fixed so as to rotate therewith.

The gearing in the construction shown causes the arbor 25, carrying the indicating hand 26, to make approximately one one-thousandth part of a revolution for each revolution of the ratchet wheel 12.

A dial 27, over which the indicating hand 26 moves, is shown as divided near its outer periphery into one hundred divisions. One complete rotation of the indicating hand will indicate approximately one thousand rotations of the ratchet wheel 12 and approximately one hundred thousand vibrations of the vibrating member. To furnish a record of the number of complete rotations of the indicating hand, a multiplying dial 28 is provided with numbers thereon running from 0 to 9 inclusive, one of such numbers being visible at a time through a hole 29 provided in the dial 27.

The multiplying dial 28 is secured on the end of an arbor 30 mounted on the front plate 5. Upon this arbor is also fixed a pinion 31, having ten teeth corresponding to the numerals on the dial. An arm or wiper 32 fixed to the arbor 25 carrying the indicating hand 26 engages at its tip or free end a tooth of the pinion 31 and, with each complete rotation of the arbor 25, the pinion 31 is moved the distance of one tooth and a new ordinal on the multiplying dial 28 is displayed through the opening 29 in the dial 27. A flat spring 33 mounted on the front plate 5 is provided with a V-shaped tip 34, which is arranged to slip into a depression between the teeth and acts as a stop pawl adapted to prevent any free movement of the pinion.

The mechanism of the device embodying my invention is shown as inclosed in a shallow cup-casing 35, being held therein by screws 36 passing through the back plate 4 of the frame. The casing is provided at its front end with an externally threaded portion 37, upon which is screwed a front cover 38. This cover comprises a circular metal ring having a shouldered portion 39 upon which a circular glass plate 40 is arranged to lie. The front end of the cover is shown as turned down to a thin edge 41 and burnished or pressed down over the glass plate to hold it securely in place. The shouldered portion 39 has a small recess 42 to receive the dial 27. The casing 35 is provided at its rear end with an externally shouldered portion 43 upon which a rear cover or backing plate 44 is screwed. Holes 45 are countersunk in the backing plate for screws 46, which secure the device to the dash board 47 or other convenient part of the vehicle.

Sealing means are provided to prevent secret access to the dial 27 or to the mechanism of the device. To prevent the removal of the front cover 38, after it has once been screwed upon the casing, a small hole is drilled through the cover and the casing at that portion where the one is screwed upon the other, and into this hole, as shown in Fig. 5, is tightly fitted a small pin 48 of the same material as the cover. The end of this pin is filed off smooth with the outer surface of the cover and the whole is polished to hide all traces of the pin and its location. Further, a steel lining 56, hereinafter mentioned, will prevent the pushing in of this pin.

The rear cover or backing plate 44 is shown as sealed to the casing 35 in a somewhat different manner. Two slotted lugs 49 and 50 are mounted on adjacent portions of the casing and backing plate respectively. A bar 51 is secured to the lug 50 and arranged to swing upon a pin 52 bridging the slot of the lug 50. When the backing plate 44 is screwed upon the casing 35 so that the slots of the two lugs will be in alinement, the pivoted bar 51 is swung over and into the slot of the lug 49. A hole 53 is drilled in the bar 49 corresponding to holes 54 provided in the walls of the lug 49 so that a wire 55 may be passed through the walls of the lug and through the bar 49 to lock the bar in the slot. The ends of the wires are then sealed with a lead seal 58, which may have a distinctive design thereon.

In mounting the device upon the dash board 47, the backing plate 44 is first screwed upon the dash board. The casing 35 is then screwed into the backing plate and sealed thereto. As shown in Fig. 5, the heads of the screws 46, which secure the device to the dash board of the vehicle, are within the casing so that the screws cannot be unscrewed to remove the device from the dash board without first removing the casing from the backing plate.

To prevent the insertion of a tool into the mechanism of the device with the object of temporarily deranging the same, the steel lining 56, hereinbefore referred to, is fitted to lie against the inner wall of the cup-casing 35, the lining being capable of resisting a steel drill of the ordinary hardness. This lining also prevents forcing in the pin 48 which locks the front cover to the body of the casing.

To prevent the influencing of the mechanism by a strong magnetic force, the vibrator and transmitting mechanism are made of a material not controllable by any magnetic force which could practicably be employed for this purpose, preferably brass.

In the operation of the device embodying my invention the jolting which the vehicle receives as it passes over the roadway will keep the vibrating lever in a constant state of vibration, the amplitude of the vibrations being the same irrespective of the extent of the individual shocks, and the ratchet wheel will be moved the same distance for each vibration and with a continuous rotational movement. By experiment, therefore, one may determine by the indication on the dial not only the number of vibrations which the vibrating member has made during the run of the vehicle, but also the approximate length of time the vehicle has been in use. The mere running of the engine of an automobile will not, however, cause sufficient movement of the vibrator to actuate the ratchet wheel.

It is obvious that various modifications may be made in the construction shown and above particularly described within the principle and scope of my invention.

What I claim and desire to secure by Letters Patent is:—

1. A vibration indicator for vehicles comprising an inertia member arranged to vibrate up and down, and resilient means opposing gravity in the inertia member substantially in vertical alinement with the center of gravity of such member and adapted to support the inertia member normally in a position substantially midway of its path of vibration.

2. A vibration indicator for vehicles comprising an inertia member pivotally mounted to vibrate up and down, and gravity-opposing means in the path of vibration of the inertia member and adapted to support the inertia member normally in a position substantially midway of its path of vibration.

3. A vibration indicator for vehicles comprising a weight, a lever mounting for the weight pivoted at one end and arranged to vibrate up and down, and gravity-opposing means engageable with the weight substantially in vertical alinement with its center of gravity and adapted to support the weight normally in a position substantially midway of its path of vibration.

4. A vibration indicator for vehicles comprising a vibrating lever pivotally mounted at one end and arranged to vibrate up and down, a weight at the free end of the lever, and a light spiral compression spring engageable with the weight substantially beneath its center of gravity and adapted to be compressed through only a part of its extent of compressibility by the vibrating member.

5. A vibration indicator for vehicles comprising a vibrating lever arranged to vibrate up and down, a weight carried by the vibrating lever, a light helical compression spring engageable with the weight substantially beneath its center of gravity and adapted to be compressed through only a part of its extent of compressibility by the vibrating member, and a casing for the spring laterally guiding the same.

6. A vibration indicator for vehicles comprising an inertia member arranged to vibrate up and down, and resilient means opposing gravity in the inertia member substantially in vertical alinement with the center of gravity of such member.

7. A vibration indicator for vehicles comprising a weight, a lever pivoted at one end and carrying the weight at the other end, the weight and lever being free to vibrate up and down, gravity-opposing means opposing the downward movement of the weight substantially in vertical alinement with its center of gravity, and indicating mechanism actuated by the lever and opposing its downward movement between the pivot and the weight, so that the total resistance to the downward movement of the weight and lever is applied substantially at the common center of oscillation of the weight and lever.

In testimony whereof I have affixed my signature in presence of two witnesses.

BERNHARD VOLKMAR.

Witnesses:
 HENRY D. WILLIAMS,
 BERNARD COWEN.